(12) United States Patent
Janson

(10) Patent No.: US 9,914,357 B1
(45) Date of Patent: Mar. 13, 2018

(54) DIFFERENTIAL CARRIER WITH INTEGRATED DRIVE GEAR AND METHOD OF MAKING THE SAME

(71) Applicant: FORD GLOBAL TECHNOLOGIES, LLC, Dearborn, MI (US)

(72) Inventor: David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/354,206

(22) Filed: Nov. 17, 2016

(51) Int. Cl.
*F16H 48/08* (2006.01)
*B60K 17/346* (2006.01)
*F16H 48/40* (2012.01)

(52) U.S. Cl.
CPC .......... *B60K 17/346* (2013.01); *F16H 48/08* (2013.01); *F16H 48/40* (2013.01)

(58) Field of Classification Search
None
See application file for complete search history.

(56) References Cited

U.S. PATENT DOCUMENTS

| | | | |
|---|---|---|---|
| 9,126,581 B2 | 9/2015 | Swales et al. | |
| 9,347,541 B2 | 5/2016 | Brooks | |
| 2005/0245342 A1 | 11/2005 | Pontanari et al. | |
| 2009/0258750 A1* | 10/2009 | Ziech | F16H 48/08 475/230 |

FOREIGN PATENT DOCUMENTS

| | | | | |
|---|---|---|---|---|
| DE | 198 54 379 A1 | 5/2000 | | |
| DE | 10260170 A1 * | 7/2004 | ............. | F16H 48/08 |
| DE | 102014000499 A1 * | 7/2015 | ............. | F16H 48/40 |
| FR | 2969243 A1 * | 6/2012 | ............. | F16H 48/08 |
| WO | WO-2015059641 A2 * | 4/2015 | ............. | F16H 48/08 |

\* cited by examiner

*Primary Examiner* — Dirk Wright
(74) *Attorney, Agent, or Firm* — James Dottavio; Brooks Kushman P.C.

(57) ABSTRACT

A powertrain includes a front differential configured to distribute torque to two front half-shafts. The differential includes a carrier body and a drive gear formed into an exterior surface of the carrier body. The powertrain further includes a power take-off unit configured to transfer torque from the carrier body to a rear axle. The unit has a PTU gear meshed with the drive gear.

20 Claims, 2 Drawing Sheets

DIFFERENTIAL CARRIER WITH INTEGRATED DRIVE GEAR AND METHOD OF MAKING THE SAME

TECHNICAL FIELD

The present disclosure relates to elements of a powertrain in a motor vehicle. More particularly, the present disclosure relates to a vehicle with a differential carrier and a power take-off unit.

BACKGROUND

Two vehicle powertrain configurations are rear wheel drive (RWD) and front wheel drive (FWD). With additional hardware, both of these configurations may be configured to direct power to all four wheels. Because traction at any particular wheel may be limited at certain times, the ability to direct power to all four wheels may improve mobility. However, the additional hardware may introduce additional parasitic losses which may increase fuel consumption in conditions that do not require the additional capability.

In a RWD configuration, the engine may be oriented longitudinally in the vehicle such that the crankshaft axis is aligned with the direction of vehicle movement. A transmission mounted to the engine drives a rear driveshaft at a speed which may be less than or greater than the speed of the engine crankshaft. The rear driveshaft is connected to a rear axle that changes the axis of rotation, reduces the rotational speed, and drives left and right rear wheels via half-shafts while permitting slight speed differences between the wheels as the vehicle turns a corner. A RWD configuration may be adapted to also drive the front wheels by adding a transfer case between the transmission and the rear driveshaft. In addition to driving the rear driveshaft, the transfer case drives a front driveshaft that, in turn, drives a front axle. Some transfer cases include a planetary gear set that divides the torque between front and rear driveshafts while allowing slight speed differences. Other transfer cases have an actively controlled torque on demand (TOD) clutch that only drives the front driveshaft in certain conditions, such as when a controller senses loss of traction of the rear wheels.

In a FWD configuration, the engine may be oriented transversely in the vehicle such that the crankshaft axis is aligned with the axis of wheel rotation. A transmission mounted to the engine drives a front differential at a suitable speed. The front differential may be integrated into a common housing with the transmission gearbox. The front differential drives left and right front half-shafts while permitting slight speed differences between the half-shafts as the vehicle turns a corner. A FWD configuration may be adapted to also drive the rear wheels by adding a power take-off unit (PTU) that drives a rear driveshaft at a speed proportional to the speed of the front differential. A rear drive unit (RDU) may include a TOD clutch that, when engaged, drives a rear axle that, in turn, drives left and right rear half-shafts.

SUMMARY

According to one embodiment, a powertrain includes a front differential configured to distribute torque to two front half-shafts. The differential includes a carrier body and a drive gear formed into an exterior surface of the carrier body. The powertrain further includes a power take-off unit configured to transfer torque from the carrier body to a rear axle. The unit has a PTU gear meshed with the drive gear.

According to another embodiment, a powertrain includes a differential and a power take-off unit. The differential includes first and second portions coupled together to form a carrier body rotatable about a carrier axis. The first portion has a drive gear formed thereon. The power take-off unit is configured to transfer torque from the carrier body. The unit includes an input shaft and a PTU gear fixedly coupled to the shaft, and the PTU gear meshes with the drive gear.

According to another embodiment, a method of assembling a powertrain includes forming a drive gear on an exterior of a first portion of a differential carrier body. The method further includes coupling the first portion with a second portion to form the differential carrier body. The method further includes meshing the drive gear with a PTU gear fixedly coupled to a PTU shaft of a power take-off unit configured to transfer torque from the differential carrier body to a rear axle.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotation speeds to be proportional with a predetermined speed ratio. If the power flow path is established in all operating conditions, then the components are fixedly driveably connected. If the power flow path is established only when one or more shift elements are engaged, then the components are selectively driveably connected.

Figure 1:
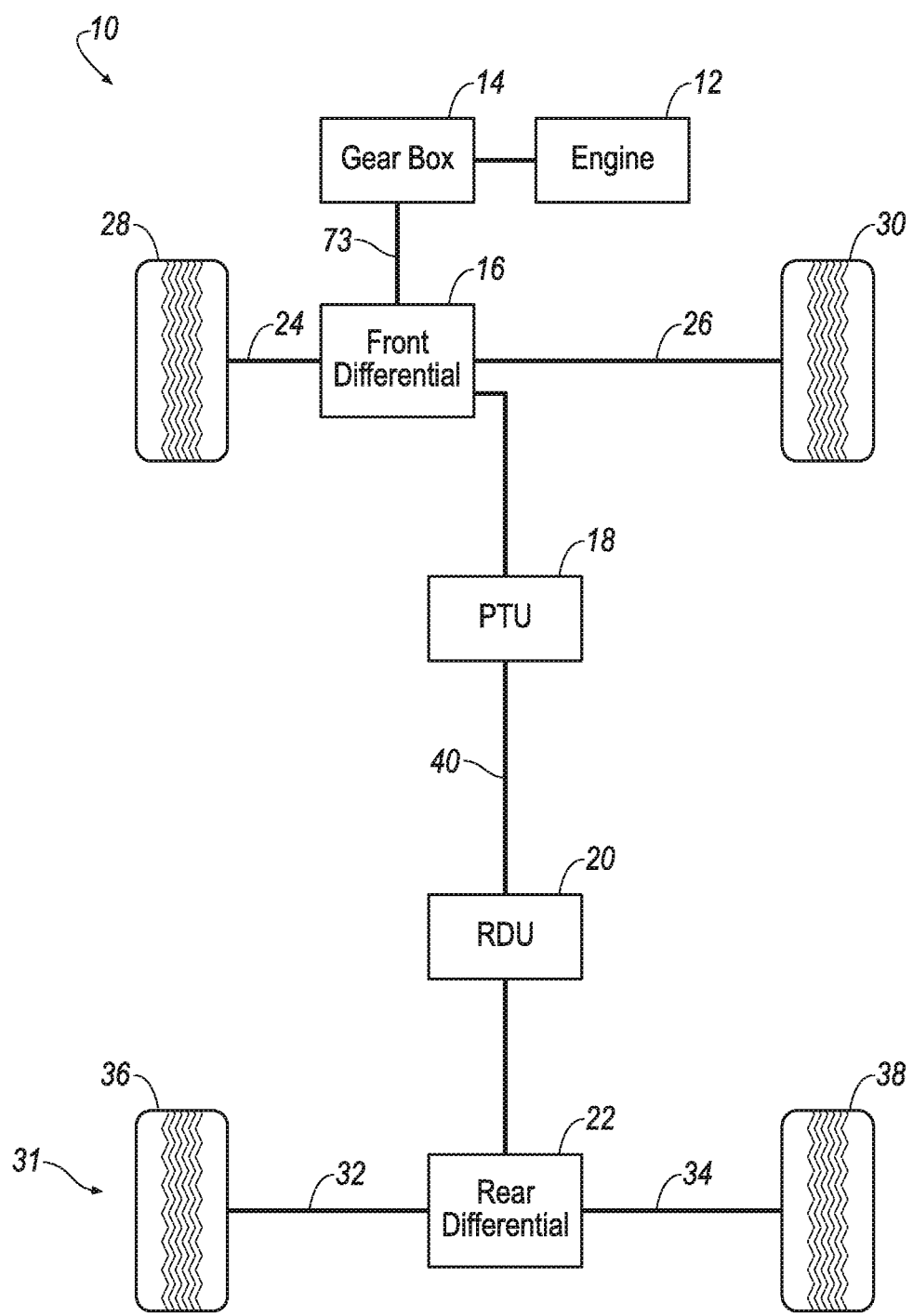
FIG. 1 is a schematic diagram of a vehicle powertrain.

FIG. 1 is a schematic diagram of a vehicle powertrain 10. Powertrain 10 may be an all-wheel drive vehicle powertrain. The heavy lines indicate the flow of mechanical power. Powertrain 10 may include an engine 12, a gearbox 14, a front differential 16, a power take-off unit (PTU) 18, a rear drive unit (RDU) 20, a rear differential 22, front half-shafts 24, 26 with front wheels 28, 30, and a rear axle 31 having rear half-shafts 32, 34 and rear wheels 36, 38. Engine 12 may be an internal combustion engine and generate mechanical power by converting stored chemical energy in a fuel source. Gearbox 14 and front differential 16 adapt the speed and torque of the mechanical power produced by engine 12 to suit the current needs of the vehicle. Gearbox 14 may be a multiple-ratio gearbox. Front differential 16 may be configured to distribute torque to front half-shafts 24, 26. Front differential 16 may provide roughly equal torque to front wheels 28, 30 while accommodating slight differences in speed such as when the vehicle turns a corner. Front differential 16 may also drive a rear driveshaft 40 via PTU 18. In some embodiments, rear driveshaft 40 is driven whenever the front wheels 28, 30 are driven. In other embodiments, rear driveshaft 40 may be disconnected in some operating conditions. RDU 20 may selectively transmit power from rear driveshaft 40 to rear differential 22. Rear differential 22 may transmit roughly equal torque to rear wheels 36, 38 while accommodating slight differences in speed.

Figure 2:
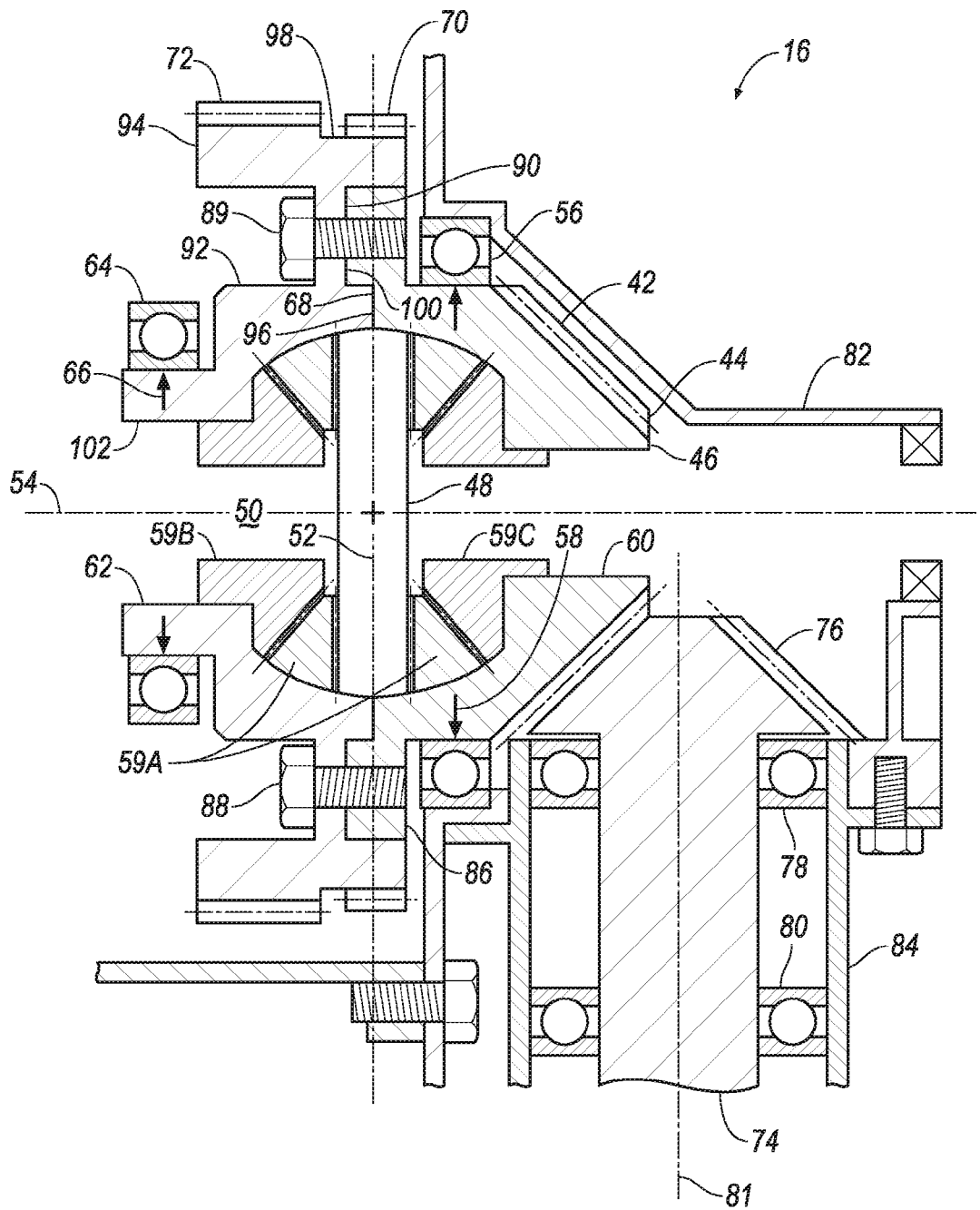
FIG. 2 is a cross-sectional view of a front differential and a power take-off unit of the powertrain of FIG. 1 in accordance with an embodiment of the instant disclosure.

FIG. 2 is a cross-sectional view of front differential 16 and PTU 18 of powertrain 10 of FIG. 1 in accordance with an embodiment of the instant disclosure. Front differential 16 may include a carrier body 42, a drive gear 44 formed into an exterior surface 46 of carrier body 42, and a pinion shaft 48 rotatably supported within an interior 50 of carrier body 42 for rotation about a pinion axis 52. Carrier body 42 may be rotatably supported for rotation about a carrier axis 54 by a bearing 56 disposed at an outer diameter 58 of carrier body 42 adjacent drive gear 44. In one embodiment, carrier axis 54 may be coaxial with the axes about which front half-shafts 24, 26 (FIG. 1) rotate. Pinion shaft 48 may also be rotatable about carrier axis 54. In one embodiment, pinion axis 52 is perpendicular to carrier axis 54. A number of beveled planet gears 59A may be supported for rotation with respect to carrier body 42. Planet gears 59A may each mesh with both left and right beveled side gears 59B and 59C. Side gears 59B, 59C may be fixedly coupled to front half-shafts 24, 26, respectively, to transfer power to front wheels 28, 30, respectively (FIG. 1). Carrier body 42 and side gears 59B, 59C may be supported for rotation about carrier axis 54. Front half-shafts 24, 26 may include universal joints to accommodate slight differences between carrier axis 54 and the axes of rotation of front wheels 28, 30 (FIG. 1). Although front differential 16 is illustrated as being a beveled gear differential, other types of differentials may be utilized within the spirit and scope of the disclosure.

As illustrated, front differential 16 may include portions 60, 62 coupled together to form carrier body 42 rotatable about carrier axis 54. Portion 60 may have drive gear 44 formed thereon. Portion 60 may be comprised of a first material with a first degree of hardness, and portion 62 may be comprised of a second material with a second degree of hardness that is less than the first degree of hardness. For example and without limitation, the material of portion 60 may be carbonized gear steel (e.g., SAE 8620) with a degree of hardness of HRC 55-60, and the material of portion 62 may be a powdered metal with a degree of hardness of HRC 35-45. Portion 60 may be rotatably supported by bearing 56, and portion 62 may be rotatably supported by a bearing 64 disposed at an inner diameter 66 of portion 62. Inner diameter 66 may be less than outer diameter 58. Pinion shaft 48 may be disposed at an intersection 68 of portions 60, 62.

Still referring to FIG. 2, powertrain 10 may further include a park gear 70 fixedly coupled to carrier body 42 for rotation about carrier axis 54. In one embodiment, park gear 70 may be fixedly coupled to portion 62. Powertrain 10 may further include a drive sprocket 72 fixedly coupled to carrier body 42 for rotation about carrier axis 54. In one embodiment, drive sprocket 72 may be fixedly coupled to portion 62 to drive rotation of carrier body 42. Drive sprocket 72 may be driven by a chain 73 which, in turn, may be driven by another sprocket coupled to gearbox 14 (chain 73 and gearbox 14 shown in FIG. 1).

PTU 18 may be configured to transfer torque from carrier body 42 to rear axle 31 (FIG. 1). PTU 18 may have an input shaft 74 and a PTU gear 76 fixedly coupled to input shaft 74. PTU gear 76 may be meshed with drive gear 44. In one embodiment, PTU gear 76 and drive gear 44 are bevel gears. In some embodiments, PTU gear 76 and drive gear 44 may be spiral bevel or hypoid gears. Input shaft 74 may be rotatably supported by bearings 78, 80 about an input shaft axis 81. In some embodiments, bearings 78, 80 may be ball bearings, roller bearings, and/or tapered roller bearings. In one embodiment, input shaft axis 81 may be perpendicular to carrier axis 54. Input shaft 74 may be fixedly coupled to rear driveshaft 40 (FIG. 1) via a universal joint. Rear driveshaft 40 may have multiple sections separated by universal joints to accommodate slightly different axes of rotation in PTU 18 and in RDU 20 (FIG. 1). In some embodiments, input shaft 74 may be integral with rear driveshaft 40. By integrating drive gear 44 with carrier body 42, less parts are needed in the PTU 18 to transmit torque from the front differential 16 to rear axle 31. As such, cost, weight, and complexity may be improved.

Still referring to FIG. 2, powertrain 10 may further include a housing 82 in which front differential 16 may be rotatably supported. Housing 82 may be fixed relative to front differential 16. PTU gear 76 may also be rotatably supported within housing 82 with input shaft 74 extending from PTU gear 76 to outside of housing 82 and into an input shaft housing 84. In one embodiment, input shaft housing 84 may extend to RDU 20 (FIG. 1).

Still referring to FIG. 2, portion 60 of front differential 16 may further include a radially outwardly extending flange 86 (relative to carrier axis 54) through which bolts 88, 89 may extend to couple portions 60, 62. Flange 86 may extend from outer diameter 58. Portion 62 of front differential 16 may include a bridge 90 extending from an inner section 92 to an outer section 94. Inner section 92 may be configured to house at least a portion of planet gears 59A, side gears 59B, 59C, and pinion shaft 48. Outer section 94 may be fixedly coupled to drive sprocket 72 and park gear 70. Bolts 88, 89 may extend through bridge 90 to couple portions 60, 62. In one embodiment, portion 62 may extend into a recess 96 of portion 60 to form at least a portion of intersection 68. Recess 96 may be disposed proximate flange 86. In one embodiment, recess 96 may be disposed radially inwardly of flange 86 (relative to carrier axis 54). Recess 96 and drive gear 44 may be disposed on opposite lateral sides of portion 60. Outer section 94 of portion 62 may include a groove 98 in which park gear 70 may reside to accommodate a difference in inner diameter of drive sprocket 72 and park gear 70. In one embodiment, portion 60 may extend into a recess 100 of portion 62. Recess 100 may be disposed radially inwardly of outer section 94 (relative to carrier axis 54). Portion 62 may also include a lip 102 rotatably supported by bearing 64. Recess 100 and lip 102 may be disposed on opposite lateral sides of portion 62.

A method of assembling powertrain 10 may include forming drive gear 44 on exterior surface 46 of portion 60 of carrier body 42. The method may further include coupling portion 60 with portion 62 to form carrier body 42. The method may further include meshing drive gear 44 with PTU gear 76 fixedly coupled to input shaft 74 of PTU 18 configured to transfer torque from carrier body 42 to rear axle 31 (FIG. 1). The method may further include forming portion 62 through a powder metal process. The method may further include rotatably supporting pinion shaft 48 of front differential 16 within portions 60, 62.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A powertrain comprising:
   a front differential configured to distribute torque to two front half-shafts, the differential including a carrier body and a drive gear formed into an exterior surface of the carrier body; and
   a power take-off unit configured to transfer torque from the carrier body to a rear axle, the unit having a PTU gear meshed with the drive gear.

2. The powertrain of claim 1, wherein the PTU gear is a bevel gear.

3. The powertrain of claim 1, wherein the drive gear is a bevel gear.

4. The powertrain of claim 1, wherein the carrier body of the front differential is rotatably supported for rotation about a carrier axis by a bearing disposed at an outer diameter of the carrier body adjacent the drive gear.

5. The powertrain of claim 1, wherein the front differential further includes a pinion shaft rotatably supported within an interior of the carrier body for rotation about a pinion axis.

6. The powertrain of claim 1, further comprising a park gear fixedly supported by the carrier body for rotation about a carrier axis.

7. The powertrain of claim 1, further comprising a drive sprocket fixedly attached to the carrier body for rotation about a carrier axis.

8. A powertrain comprising:
   a differential including first and second portions coupled together to form a carrier body rotatable about a carrier axis, the first portion having a drive gear formed thereon; and
   a power take-off unit configured to transfer torque from the carrier body, the unit including an input shaft and a PTU gear fixedly coupled to the shaft,
   wherein the PTU gear meshes with the drive gear.

9. The powertrain of claim 8, wherein the PTU gear is a bevel gear.

10. The powertrain of claim 8, wherein the drive gear is a bevel gear.

11. The powertrain of claim 8, wherein the first portion is comprised of a first material with a first degree of hardness and the second portion is comprised of a second material with a second degree of hardness that is less than the first degree.

12. The powertrain of claim 8, wherein the first portion of the differential is rotatably supported by a first bearing disposed at an outer diameter of the first portion adjacent the drive gear.

13. The powertrain of claim 12, wherein the second portion of the differential is rotatably supported by a second bearing disposed at an inner diameter of the second portion that is less than the outer diameter.

14. The powertrain of claim 8, wherein the differential further includes a pinion shaft rotatably supported within an interior of the carrier body for rotation about a pinion axis.

15. The powertrain of claim 14, wherein the pinion shaft is disposed at an intersection of the first and second portions of the differential.

16. The powertrain of claim 8, further comprising a park gear fixedly coupled to the second portion of the differential.

17. The powertrain of claim 8, further comprising a drive sprocket fixedly coupled to the second portion of the differential to drive rotation of the carrier body, wherein the drive sprocket is driven by a chain.

18. A method of assembling a powertrain, comprising:
    forming a drive gear on an exterior of a first portion of a differential carrier;
    coupling the first portion with a second portion to form the differential carrier; and
    meshing the drive gear with a PTU gear fixedly coupled to a input shaft of a power take-off unit configured to transfer torque from the differential carrier to a rear axle.

19. The method of claim 18, further comprising forming the second portion through a powder metal process.

20. The method of claim 18, further comprising rotatably supporting a pinion shaft of a differential within the first and second portions.

* * * * *